Aug. 17, 1926. 1,596,570
R. J. ALTGELT ET AL
PLOW
Filed Feb. 26, 1923 2 Sheets-Sheet 2
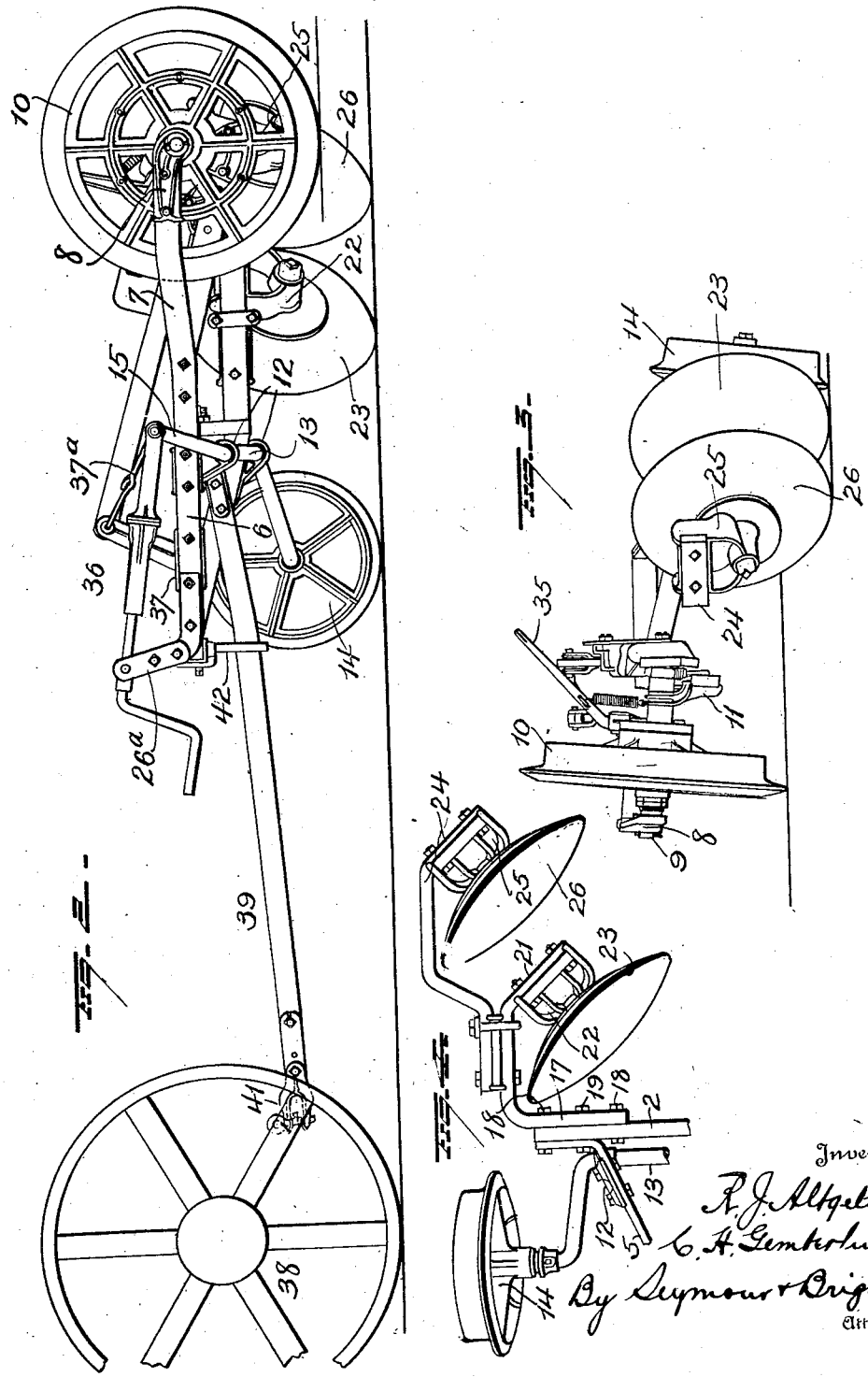

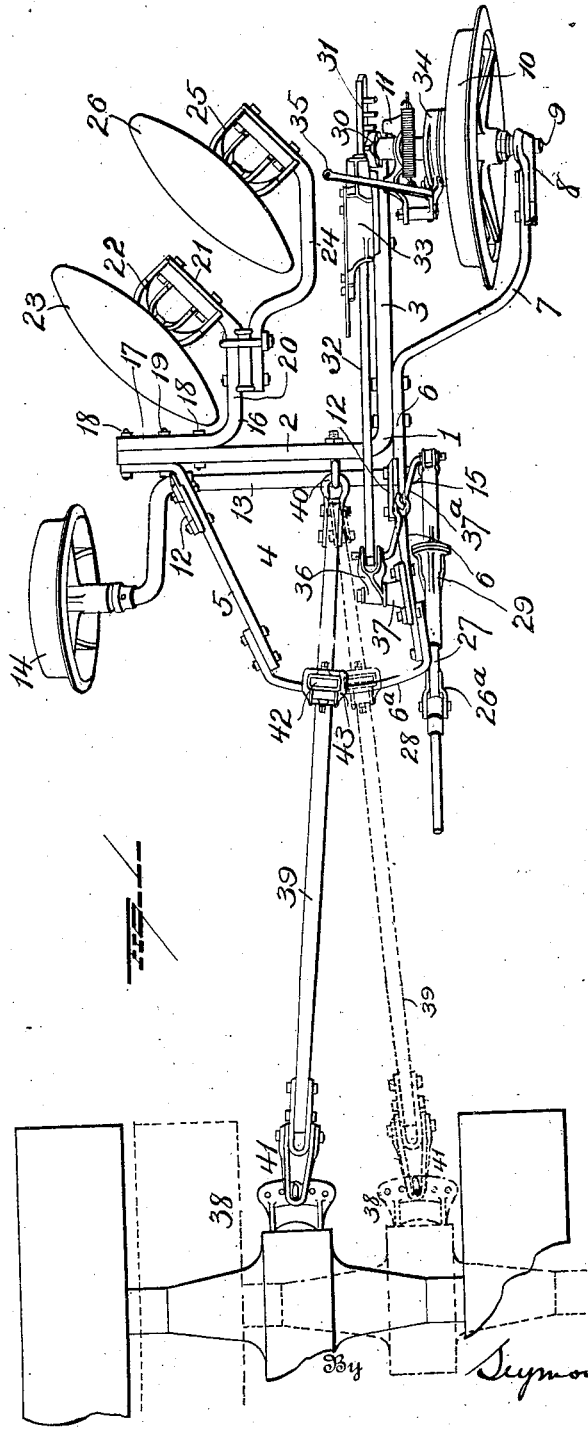

Patented Aug. 17, 1926.

1,596,570

UNITED STATES PATENT OFFICE.

RUDOLPH J. ALTGELT AND CAMERON H. GEMBERLING, OF SOUTH BEND, INDIANA, ASSIGNORS TO OLIVER CHILLED PLOW WORKS, OF SOUTH BEND, INDIANA.

PLOW.

Application filed February 26, 1923. Serial No. 621,306.

This invention relates to improvements in plows, and more particularly to those of the "disk" type,—one object of the invention being to provide disk plow structure which shall be well adapted for use in an orchard in a manner to effectually plow the ground in close proximity to the trees without danger of injury to the latter.

A further object is to so construct a disk plow that it may be adjusted to plow the earth close to the trees and throw the furrow slices in a direction toward the trees, or adjusted to throw the furrow slices in a direction away from the trees.

A further object is to so construct a tractor-drawn disk plow that the earth-working disks may be caused to operate close to the trunks of the trees, while the tractor may travel at some distance laterally from the trees.

A further object is to construct a tractor-drawn disk plow in such manner that the major portion of the weight of its frame shall be at the side opposite to that at which the earth-working disks are located and as near as practicable in line with the wheel at the heavier land side of the structure, so that the weight of this side of the structure will control the line of draft in order that the disks may work to one side of the line of travel of the tractor when plowing earth to or from a row of trees, and also to construct the plow in such manner that it may be adjusted to travel directly behind the tractor for plowing in a treeless field.

With these and other objects in view the invention consists in certain novel features of construction and combinations of parts as hereinafter set forth and pointed out in the claims.

In the accompanying drawings;

Figure 1 is a plan view of a plow structure embodying our improvements and showing, in full lines, the relation of the tractor to the plow when the latter is adapted for plowing in an open or treeless field and showing in dotted lines the relative positions of the tractor and plow when plowing.

Figure 2 is a view in side elevation;

Figure 3 is a rear end view, and

Figure 4 is a fragmentary view showing the earth-working disks adjusted to throw the furrow slices in a direction away from the trees in a field.

The main frame 1 of the plow structure is approximately L-shaped, comprising a forward beam 2 disposed at right angles to the line of draft and a side beam 3 extending rearwardly from one end of the forward beam 2 and preferably integral therewith.

A forward frame portion or extension 4 is rigidly secured to the main frame 1 and comprises side members 5 and 6 bolted to the main frame and a forward rail 6ª, which latter may be curved. The side member 6 of the frame portion 4 is extended rearwardly and laterally and forms a bracket 7, to the rear end of which, a bearing member 8 is secured for the accommodation of the axle 9 of a heavy, flanged ground wheel 10,—said axle also having a bearing in a bracket 11 secured to the rear end portion of the side member 3 of the main frame.

Bearing brackets 12, 12 are secured to the forward frame portion or extension 4, in which a crank axle 13 for a forward flanged ground wheel 14, is mounted,—said axle being provided at the end thereof farthest from the forward ground wheel, with a crank arm 15, for a purpose hereinafter explained.

Secured to the end portion of the forward transverse member 2 of the main frame so as to be disposed at the side of the plow structure opposite to that with which the heavy ground wheel 10 is connected, is an angular bracket 16. The forward member 17 of the bracket lies parallel with the frame beam 2 and may be secured to the latter with the use of three bolts 18, 18 and 19,— the central bolt 19 being preferably such as will permit pivoting of the bracket when the bolts 18 shall have been removed. The member 20 of the bracket 16 projects rearwardly from one end of the member 17 and from said member 20, a bracket arm or member 21 projects rearwardly and laterally so as to be disposed at approximately forty-five degrees (more or less) to the longitudinal axis of the plow structure. A bearing bracket 22 for an earth-working disk 23, is secured to the bracket arm, and said disk is thus so disposed as to throw the earth or furrow slices laterally in a direction toward a tree which the plow may be caused to pass. An angular bracket 24 may be secured to the intermediate portion 20 of bracket 16 and carries at its rear end portion, a bearing bracket 25 for an earth-working disk 26,—the latter being thus disposed rearwardly of and parallel with the disk 23. If desired, the rear disk and its mountings might be omitted.

In order that the disks may be reversed so as to cause them to throw the earth or furrow slices in a direction away from the trees instead of toward them, the operator will first unbolt the bearing brackets 22—25 from the brackets 16 and 24. The bolts 18 may then be removed and the bracket 16 turned on the intermediate bolt 19 from the position shown in Figure 1 to the position shown in Figure 4. The rear disk bracket 24 may remain bolted to the bracket 16. After the brackets 16 and 24 shall have been turned over and the bolts 18 replaced, the bearing brackets (carrying the disks) may be again bolted to the brackets 16, 24.

To provide means for adjusting the depth to which the earth-working disks may enter the ground, the instrumentalities now to be explained may be employed:

A bifurcated arm 26ª is secured to the forward frame portion or extension 4 and carries a pivoted sleeve through which a manually operable shaft 27 passes and which is limited in its movement in one direction by a stop collar 28 on said shaft. The shaft 27 enters a housing 29 and has screw connection therewith, preferably in a manner to provide ball-bearing screw devices such as described and shown in patent granted to Rudolph J. Altgelt on the 13th day of March, 1923, and designated by No. 1,448,426;—the rear end of the screw housing 29 being pivotally connected with the crank arm 15 of the crank axle 13. It is evident that when the screw shaft 27 is turned, motion will be imparted to the crank axle 13 and the plow frame will be raised or lowered sufficiently through the medium of the ground wheel 14 (the ground wheel 10 acting as a fulcrum) to adjust the disks for depth of plowing.

For raising the plow by power means, mechanism such as will now be explained may be employed: The axle 9 carries at its inner end, a pinion 30 to mesh with a rack 31 forming the rear portion of a longitudinally movable actuating bar 32, which latter is movable through a guide bracket 33 secured to the main frame 1. A clutch indicated at 34 is provided for locking the wheel 10 to its axle, and a control lever 35 is provided for said clutch,—all of which is similar to and is fully shown and described in patent granted to Rudolph J. Altgelt May 3, 1921, and designated by No. 1,377,049. The forward end of the actuating bar 32 is pivotally connected with an arm 36 pivotally connected, through the medium of a bracket 37 with the forward portion or extension 4 of the frame, and the pivoted arm 36 is connected, through the medium of links 37ª with the crank arm 15 of the crank axle 13. It is evident that with such construction, clutching of the axle 9 to the ground wheel 10, will cause motion to be transmitted through the rack and pinion gearing and actuating bar, to the forward crank axle and the plow frame to be raised, in which position it will be held, after release of the clutch and caused to descend upon subsequent manipulation of the control lever, in the manner fully explained in Patent No. 1,377,049 before mentioned.

The plow structure is connected with a tractor indicated at 38, through the medium of a draft bar or beam 39. The rear end of the draft bar is loosely connected by coupling devices 40 with the transversely disposed member 2 of the main frame 1 near the juncture of the members 2 and 3 of said frame, so that the connection of the draft bar with the plow structure will be approximately in the line of draft of the latter, and the forward end of the draft bar is connected with the tractor through the medium of coupling devices indicated at 41. The draft bar passes under the curved forward rail 6ª of the frame extension 4 and through a suitable opening in a vertical bar 42. The bar 42 is adjustably secured to a clamp 43 and the latter is supported by and adjustable on the front rail 6ª of the frame extension 4. The draft bar 39 is thus supported by the front rail of the frame extension in such manner that it may be adjusted both vertically and laterally relatively to the same. When the plow is to be used for plowing close to trees, the draft bar will be adjusted to the position on the front rail of the frame extension as shown in dotted lines in Figure 1, and the plow will project laterally from the path traveled by the tractor, so that the soil-engaging disks may work close to the trees without danger of injury to the latter by the tractor as also indicated in Figure 1. When the plow is to be used in a field where there are no trees, the adjustment of the draft bar and the position of the tractor relatively to the plow structure may be as indicated in full lines in Figure 1.

It will be observed that with our improvements, there will be such a preponderance of weight at the side of the structure opposite to the disks, that such weight will control the line of draft in order that the disks may work to one side of the path traveled by the tractor when plowing earth toward or from a row of trees. While the wheel 10 will be made heavy, it is evident that additional weight may be secured thereto if necessary.

Various changes might be made in the details of construction of our invention without departing from the spirit thereof or limiting its scope and hence we do not wish to restrict ourselves to the precise details herein set forth.

Having fully described our invention what we claim as new and desire to secure by Letters-Patent, is:—

1. In a plow structure, the combination of an angular frame comprising a longitudinally disposed frame bar and a transverse frame bar extending from the forward end of the longitudinal frame bar, an earth working disk, supporting means for said disk secured to the free end portion of said transverse frame bar, a heavy ground wheel located adjacent the rear end of the longitudinal frame bar, and draft means attached to said angular frame in proximity to the forward end of said longitudinally disposed frame bar.

2. In a plow structure, the combination with a frame, a flanged ground wheel at one side thereof, an earth-working disk at the other side of said frame, a ground wheel in advance of said disk, a crank axle for said last-mentioned disk and having an arm, power lift mechanism cooperable with said first-mentioned ground wheel and including an actuating bar, a pivoted arm with which said actuating bar is connected, and a flexible connection between said pivoted arm and the arm on the crank shaft.

3. In a plow structure, the combination with a frame, a flanged ground wheel at one side thereof, an earth-working disk at the other side of said frame, a ground wheel in advance of said disk, a crank axle for said last-mentioned disk and having an arm, power lift mechanism cooperable with said first-mentioned ground wheel and including an actuating bar, a pivoted arm with which said actuating bar is connected, a flexible connection between said pivoted arm and the arm on the crank shaft, and adjusting means connected with said crank axle.

In testimony whereof, we have signed this specification.

RUDOLPH J. ALTGELT.
CAMERON H. GEMBERLING.